(12) United States Patent
Skinner

(10) Patent No.: US 11,317,560 B2
(45) Date of Patent: May 3, 2022

(54) TWO-COLORED TRIMMER LINE FOR CENTERING THE LINE IN A TRIMMER HEAD

(71) Applicant: SHAKESPEARE COMPANY, LLC, Columbia, SC (US)

(72) Inventor: David B. Skinner, Columbia, SC (US)

(73) Assignee: SHAKESPEARE COMPANY, LLC, Columbia, SC (US)

(*) Notice: Subject to any disclaimer, the term of this patent is extended or adjusted under 35 U.S.C. 154(b) by 40 days.

(21) Appl. No.: 16/889,011

(22) Filed: Jun. 1, 2020

(65) Prior Publication Data

US 2020/0375100 A1    Dec. 3, 2020

Related U.S. Application Data

(60) Provisional application No. 62/855,343, filed on May 31, 2019.

(51) Int. Cl.
*A01D 34/416* (2006.01)

(52) U.S. Cl.
CPC ........ *A01D 34/4168* (2013.01); *A01D 34/416* (2013.01)

(58) Field of Classification Search
CPC ................................. A01D 34/4168
See application file for complete search history.

(56) References Cited

U.S. PATENT DOCUMENTS

| 1,982,304 | A | 11/1934 | Holden |
| 4,566,189 | A | 1/1986 | Muto |
| 4,756,146 | A | 7/1988 | Rouse |
| 5,060,384 | A | 10/1991 | Everts |
| 5,109,607 | A | 5/1992 | Everts |
| 5,881,464 | A | 3/1999 | Collins et al. |
| 5,979,064 | A | 11/1999 | Kitz et al. |
| 6,434,837 | B1 | 8/2002 | Fogle |
| 8,025,249 | B2 | 9/2011 | Alliss et al. |
| 2018/0110182 | A1 | 4/2018 | Nolin et al. |
| 2018/0177122 | A1 | 6/2018 | Skinner |
| 2020/0281116 | A1* | 9/2020 | Guo .................. A01D 34/4168 |

FOREIGN PATENT DOCUMENTS

WO    20190213094 A1    11/2019

* cited by examiner

*Primary Examiner* — Omar Flores Sanchez
(74) *Attorney, Agent, or Firm* — Renner, Kenner, Greive, Bobak, Taylor & Weber

(57) ABSTRACT

A trimmer line for use with a trimmer head of a rotary trimmer is provided, wherein the trimmer line comprises two substantially equal lengths of line connected to each other by one of their ends to form the trimmer line, the two substantially equal lengths of line being of different colors to indicate the middle of the trimmer line. Such a trimmer line allows to easier, or more at least more accurate, spooling of the trimmer line on a trimmer head.

3 Claims, 1 Drawing Sheet

TWO-COLORED TRIMMER LINE FOR CENTERING THE LINE IN A TRIMMER HEAD

TECHNICAL FIELD

The present invention is generally related to trimmer line. More particularly, the present invention is directed to trimmer line of two colors that provides a centering feature for use in trimmer heads.

BACKGROUND OF THE INVENTION

Vegetation trimming devices, also known as rotary trimmers or string trimmers, are well known and are commonly used to maintain one's lawn and garden, particularly around areas that are hard to reach with an ordinary lawn mower, such as fences, walls or trees. Generally, such rotary trimmers include an elongated shaft with a rotating element or gear head near one end of the elongated shaft, and a trimmer head attached to the gear head. Typically, the trimmer head is configured to receive and retain one or more trimmer lines therein such that the trimmer head rotates the trimmer line(s), allowing the trimmer line to cut or trim the grass, weeds, or other vegetation.

There are a number of different classes of rotary trimmer heads defined generally by the manner in which a monofilament trimmer line is spooled or replaced in the trimmer head and/or how the trimmer line is discharged, indexed or lengthened during use of the trimmer head. With respect to discharging, indexing and lengthening the trimmer line during use, the most common types of traditional trimmer heads are the "bump-feed" or "bump-activated" trimmer head and the "automatic-feed" or "auto-indexing" trimmer head. Both types of trimmer heads contain an internal spool that holds a reserve of wound trimmer line. As the trimmer line wears away, it can be replaced from the internal spool. In a bump-activated, trimmer head, short lengths of line are released from the spool when the bottom of the trimmer head is impacted or "bumped" against a hard surface. In an auto-indexing trimmer head, a short length of line is released from the spool without the operator having to manually strike or bump the bottom of the trimmer head on the ground. Many mechanisms exist in the prior art for controlling the release of wound trimmer line from the internal spool of a trimmer head. Bump-activated trimmer heads are exemplified by U.S. Pat. No. 5,881,464 to Collins, entitled Line Head For Flexible Line Trimmer. Automatic-feed trimmer heads are exemplified by U.S. Pat. No. 5,060,384 to Everts, entitled Automatic Head For A Line Trimmer; U.S. Pat. No. 5,109,607 to Everts, entitled Automatic Line Trimmer Head; and U.S. Pat. No. 4,566,189 to Muto, entitled Filament Type Trimmer Apparatus Cutters.

With respect to spooling and replacing the trimmer line in the trimmer head, there is the traditional spooled trimmer head wherein a line is typically manually wound around spool and bump-fed or auto-indexed to provide a longer length of line during use. However, there are various problems with such traditional trimmer heads when it comes to replacing or re-spooling the trimmer line. In most cases for traditional trimmer heads, in order to replenish and reload new trimmer line into the trimmer head, the trimmer head had to be disassembled and the internal spool removed. This process was often difficult, labor intensive, and highly time consuming for many homeowners to complete successfully or even attempt.

It is also noted that many string trimmers today contain two lengths of trimmer line that extend from opposite sides of the bump-feed trimmer head, but the two lengths are part of a continuous length of line. A common problem, particularly for bump-feed trimmer heads, is having the line entangled on the spool. Most bump-activated trimmer heads and even some auto-indexing trimmer heads rely upon centrifugal forces to pull the trimmer lines from the spool. If the trimmer lines tangle, twist or become buried under subsequent windings, the trimmer lines will not dispense in the proper manner. These problems typically stemmed from the skill of the user who wound the line onto the spool internal to the head. The trimmer head must then be disassembled, the trimmer line unwound and again rewound in the proper manner before the trimmer head will again work as designed.

In an attempt to overcome these problems, two other classes of trimmer heads have been invented. One class of trimmer head is a "fixed line" trimmer head. Many aftermarket trimmer heads for rotary trimmers are fixed-line trimmer heads. These types of trimmer heads are easily designed to be universally adaptable to essentially any brand of rotary trimmer regardless of the operation of the trimmer head or the direction of rotation. Such trimmer heads utilize a housing which has a series of spaced line holders or an easy means or inserting, holding and/or removing multiple trimmer lines. As the line wears, the consumer must manually insert a new length of trimmer line into a line channel maintained within the trimmer head. The consumer controls the length of the line that is inserted. Notably, these types of trimmer heads are spoolless.

The other class is commonly known as the "easy-load" trimmer head which attempts to combat the primary problem associated with reloading spooled trimmer heads by providing a method for easily loading the trimmer line onto an internal spool without having to disassemble the trimmer head. Such easy-load type trimmer heads typically have a set of ramps, guides and/or channels to create a passageway through which trimmer line may pass from one side of a trimmer head to the opposite side of the trimmer head. With these features, the trimmer line can be loaded into the head and the line wound on the internal spool without having to disassemble the trimmer head. These features are unique to easy-load type trimmer heads and are advancements over older head designs which required the user to disassemble the head to manually wrap the line on the spool.

To wind the trimmer line onto the internal spool of an easy-load type trimmer head, the user must be able to rotate the internal spool relative to the housing for the concept to work. With these designs, the user loads the trimmer line into the trimmer head by passing the trimmer line through the line channel until equal lengths of trimmer line extend from both eyelets. Then, by rotating the internal spool, typically by mechanical means connected to the spool, the line is wound on the spool. Thus, the mechanical operation and inner workings of the trimmer head allow for the loading of replacement trimmer line without disassembly of the head.

With respect to the trimmer line channel or passageway, there are patents directed toward line channels that go straight through the center of the spool. However, because the line channel goes through the middle of the head, this concept limits the type of trimmers to which the trimmer head can attach. Basically, it is only commercially viable for a string trimmer with short mounting stems. Accordingly, patents have been directed to easily loading trimmer line through a trimmer head by having the trimmer line travel around the lateral perimeter of the central opening or bore and then continuing to the opposite side of the trimmer head from where it entered. One example of this type of arrangement can be found in U.S. Pat. No. 8,025,249 to Alliss et al., entitled Bi-Directional Trimmer Head Spool with Curved Trimmer Line Guide. Yet other patent applications are directed to easily loading the trimmer line through a trimmer head by having the trimmer line travel vertically under the central opening or bore and then continuing to the opposite side of the trimmer head from where it entered. An example of this type of arrangement can be found in US Patent Application Publication No. US20180177122A1 to Skinner, entitled Easy to Load Trimmer Head with Forced Discharge. The latter two arrangements are more beneficial for aftermarket trimmer heads because they teach trimmer heads that are able to connect to a wide range of trimmer models.

The primary problem associated with these easy-load trimmer heads is that the user has to determine where the trimmer line length is equal on opposite sides of trimmer head. If the length of line extending from both sides of the trimmer head is not substantially equal, then upon winding of the trimmer line onto the internal spool, there will be more line left out of the spool on one side than the other. While the user could simply cut the length of trimmer line that is too long, this wastes line that could have been used for grass or weed trimming.

Accordingly, attempts have been made to provide a centering mechanism on the trimmer line itself. One attempt to provide such a centering mechanism is set forth in US Patent Application Publication No. US20180110182A1 to Nolin et al. entitled Trimmer Line with Centering Feature. In that application, the trimmer line includes indicia formed on the elongated body of the trimmer line at a center point or spaced from the center point a distance greater than or equal to about half of the outer diameter of the trimmer head itself. While this centering mechanism, i.e., indicia, would clearly help the user, it is noted that, depending upon the indicia, such as ink, the indicia could be removed from the line by washing or otherwise.

Accordingly, there is a need in the art for a trimmer line that provides means to reliably and accurately center a trimmer line through a trimmer head so that equal lengths of trimmer line extend from both sides of the trimmer head prior to spooling the trimmer line onto the internal spool of the trimmer head.

SUMMARY OF THE INVENTION

In light of the foregoing, it is a first aspect of the present invention to provide a trimmer line for use with a trimmer head of a rotary trimmer, the trimmer line comprising two substantially equal lengths of line connected to each other by one of their ends to form the trimmer line, the two substantially equal lengths of line being of different colors. The two substantially equal lengths of line may be about 7 feet in length, with the length of the trimmer line is 14 feet. In one embodiment, one of the two lengths of line may be orange and the other of the two lengths of line may be yellow. The trimmer line may further include a shrink sleeve, wherein the two lengths of line are connected by the shrink sleeve. As another alternative, the two lengths of line may be melt fused together. And as further alternatives, the two lengths of line may be ultrasonically welded or radio-frequency welded together.

It is another aspect of the present invention to provide a method for determining the center of a trimmer line for use with a trimmer head of a rotary trimmer, the method comprising splicing an end of each of two substantially equal lengths of line of different color together to provide a trimmer line having a color change at the center of the trimmer line. In one embodiment, the step of splicing includes joining the end of one of the two lengths of line to the end of the other of the two lengths of line with a shrink sleeve. In another embodiment, the step of splicing includes melt fusing the end of one of the two lengths of line to the end of the other of the two lengths of line. In yet another embodiment, the step of splicing includes ultrasonically or radio-frequency welding the end of one of the two lengths of line to the end of the other of the two lengths of line.

It is still another aspect of the present invention to provide a method for determining the center of a trimmer line for use with a trimmer head of a rotary trimmer, the method comprising the steps of extruding the trimmer line and dyeing half of the length of trimmer line with a colorfast dye of a color different from the color of the trimmer line, thereby providing a trimmer line having a color change at the center of the trimmer line. In one embodiment, the step of dyeing includes changing the color of the extrudants such that half of the trimmer line is one color and the other half of the trimmer line is another color. In another alternative embodiment, the extrudants include colorants or polymers of different colors.

BRIEF DESCRIPTION OF THE DRAWINGS

These and other features and advantages of the present invention will become better understood with regard to the following description, appended claims, and accompanying drawings wherein:

DETAILED DESCRIPTION OF THE INVENTION

Figure 1:
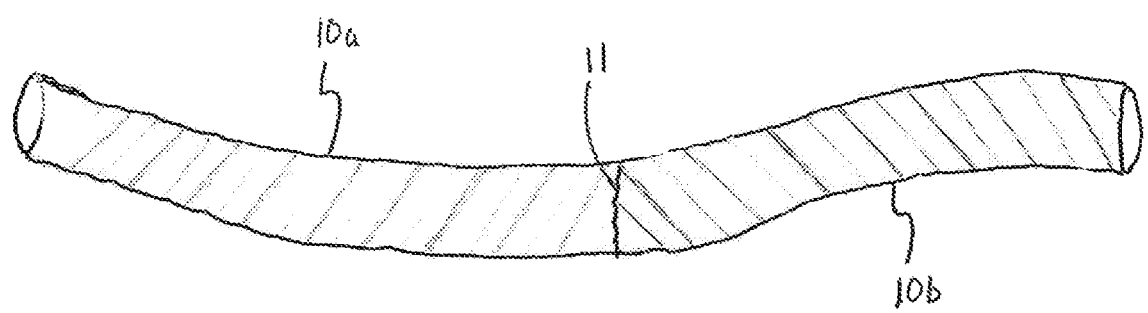
FIG. 1 is a close-up perspective view of two lengths of line of different colors melt fused together to provide the trimmer line according to the concepts of the present invention.

In general, the present invention is directed to a trimmer line made from two monofilament lines of different colors that are of substantially equal length and that are connected or joined together. As such, the place where the lines of equal length are joined provides or otherwise signifies to the user the center of the entire trimmer line length. Thus, when using the trimmer line with an easy load trimmer head of a rotary trimmer, the user will be able to quickly, reliably, and accurately determine when he or she has passed half of the trimmer line through the trimmer head so that the trimmer line can be wound onto the internal spool for use as the cutting element of the string trimmer. This improved method and coil will eliminate the need to trim one line to match the other due to differences in the lengths extending from the eyelets.

Currently, most trimmer lines are sold in lengths from 30 feet to 400 feet in length. However, there is a trend to offer retail packages of 14-foot long coils of monofilament line. This length is suitable for use with easy load trimmer heads. The 14-foot length makes for one refill of the trimmer head. The monofilament line is cut to this length and wound into coils and packaged. The 14-foot length is the optimal length of line put on one spool at a time. Accordingly, substantially equal 7-foot sections of line are provided and connected by one of their ends in one of a various of ways to produce the 14-foot trimmer line of the present invention, wherein one 7-foot length is of one color and the other 7-foot length is another, different color. For example, in one embodiment, one 7-foot length of line may be orange, while the other 7-foot length of line may be yellow. The lines may be any color desired for the monofilament trimmer line, with the only parameter being that they be sufficiently visibly different from each other that the user will be able to easily place the center of the trimmer line (where the color change takes place) in the interior body of the trimmer head.

It will also be appreciated that while a 14-foot coil of trimmer line is the ordinary length of trimmer line in any one-use package, larger or smaller coils of line can be provided without departing from the spirit of the invention. Thus, if a spool for a trimmer head is known that generally suggests using 8 feet of trimmer line, it will be appreciated that two equal 4-foot lengths of line may be spliced or otherwise joined together. Likewise, if a spool for a trimmer head is known that generally suggests using 18 feet of trimmer line, then two equal 9-foot lengths of line may be joined or otherwise spliced together. Likewise, 10 feet of trimmer line will have equal 5-foot lengths of line spliced or joined together, while 12 feet of trimmer line will have equal 6-foot lengths of line spliced or joined together. The invention provides that, by making half of a length of trimmer line a different color from the other half, the user will readily be able to determine the center of the trimmer line so that, upon inserting the trimmer line through the passage way of the trimmer head, the user can determine that substantially equal lengths of trimmer line extend from the trimmer head and he can then wind the trimmer line onto the internal spool as is well known for such easy load trimmer heads.

It will further be appreciated that coils of trimmer line substantially longer than 14 feet may be provided for larger containers and packages. However, provided the trimmer line is to be used for trimmer head spools that are essentially filled when provided with 14 feet of trimmer line, it will be appreciated that the trimmer line changes colors longitudinally every 7 feet. Thus, there could be provided a 70 feet coil of trimmer line wherein there is line of two different colors joined together every 7 feet. The user, after removing 14 feet of line (i.e., two colors of line) can cut the line at the second color change point so that he or she may use the 14-foot length for replacing the trimmer line in a trimmer head. After then length of trimmer line is depleted, the user can go back to the same packaging and obtain another 14-foot length of line by uncoiling the trimmer line from the packaging until two colors of line have been removed. The user can again cut the line and replace the depleted line in the same manner as previously described. For a 70-foot coil, the user could do this five times, and be able to determine the center of a 14-foot length of trimmer line each time.

Thus, it will be appreciated that multiple 14-foot coils of monofilament trimmer line can be wound such that 7 feet of the trimmer line is one color (e.g, orange) and the rest (i.e., the other 7 feet) of the line is another color, (e.g., yellow). The two differently colored monofilaments lines can be made in any of a number of ways. The following provides some of the ways the two pieces of trimmer line may be joined together.

Figure 2:
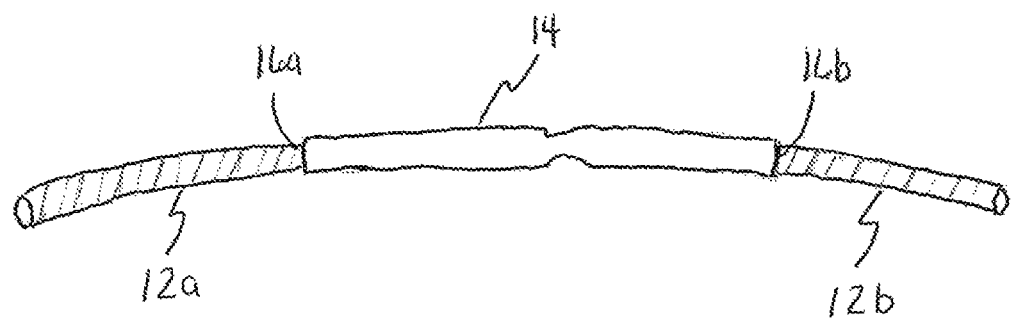
FIG. 2 is a close-up perspective view of two lengths of line combined together using a shrink sleeve to provide the trimmer head according to the concepts of the present invention.

First, as shown in FIG. 2, the two substantially equal lengths of line (12a, 12b) may be joined by connecting them with a shrink sleeve 14. This method works rather well, i.e., creates a strong bond or connection between the two ends of the equal length lines. Generally, the two pieces of line can be fed from supply spools. The two free ends would be inserted into a shrink sleeve (tube) at ends 16a, 16b. The two inserted ends could be touching or slightly separated, but ideally not overlapping. The shape of the cut of the ends being combined could be blunt or tapered. Heat would be applied by a hot air gun or other means sufficiently long enough to cause the sleeve tubing to shrink and form against the two pieces of trimmer line. In FIG. 2, both pieces of line are shown as plastic of the same color, but ideally one piece would be one color and the other would be a second color. The tubing shown in FIG. 2 was heat shrinkable sleeve tubing with an outer wall of polyolefin and an inner wall of meltable adhesive. The tubing may have at least a 2:1 or more shrink ratio, and preferably a 3:1 shrink ratio.

Another way to join or connect the two equal lengths of different color lines is by melt fusing the ends of the two lengths of line together. This is more particularly shown in FIG. 1. Generally, the two pieces of line (10a, 10b) can again be fed from supply spools. The two free ends would be inserted into positioning tubes which are separated by a flat metal blade. The metal blade would be quickly heated to a temperature slightly hotter than the melting point of the polymer or plastic (e.g., nylon) from which the line is made. The two free ends of trimmer line would be pressed against the blade and the polymer (nylon) at the end of each line melted. The hot blade would then be retracted, and the tips of the two lines pressed together such that the two portions of molten nylon mingled and fuse together, essentially forming a splice or joint 11. The molten nylon would be allowed to cool, resulting in connecting the two pieces of line. Both of the supply lines would be cut an equal distance from the joint. By using one color (shown as plastic having shading in one direction) of line from one supply spool and a second color (shown as plastic having shading in a different direction) of line from a second supply spool, the result would be a two-colored line with essentially equal portions of line on either side of the splice or joint. This length of line could then be packaged and sold as noted above. The benefit to the consumer is convenience. The consumer would center the trimmer line by knowing that the color change in the middle of the trimmer line is its center. Thus, by aligning the color change in the middle of an easy load head prior to winding the line onto the internal spool, the user will not waste any line. That is, the benefit of this trimmer line is that there is no wasted line and the line is nicely centered on the trimmer head.

A second method for melt fusing the two ends of the equal length lines together can be provided by modifying by tilting the plane of the blade described above such that tapered tips are formed on the two ends of the trimmer line prior to joining the molten portions. This taper is visible in FIG. 1, to the extent it shows an approximately 90-degree blunt taper. Generally, the angles of tilt of the blade can range from 90 degrees (blunt) and 10 degrees (long taper), and ideally between 75 degrees and 25 degrees, and preferably between 45 and 25 degrees. It is noted, however, that as the angle approaches 10 degrees, the surface areas of the overlapped fibers would increase. Thus, it will be understood that tapering of the joints or splice will create more surface area between the two pieces of line for joining them together. As long as the length of the splice is less than 3-4 inches, then the tapered portion would be hidden inside of the trimmer head when the line is installed. That is, because most easy load trimmer heads are at least 3 or 4 inches in diameter, any splice of less than 3 or 4 inches will be maintained in the trimmer head and not visible while the string trimmer is in use.

Yet another method of combining the two-line ends would be to use ultrasonic welding to combine the two distal ends of the two differently-colored trimmer lines. In this method, portions of the axis of the line should overlap. However, again, such overlap should not be more than 3 or 4 inches, and preferably would be less than 2 inches. This will result in a combined diameter at the overlap that is larger than the size of the two lines. Alternatively, the two ends of line could be cut at an angle, and then the two tapered portions of line overlapped prior to ultrasonic welding the line. Generally, ultrasonic welding is an industrial technique whereby high-frequency ultrasonic acoustic vibrations are locally applied to the lines being held together under pressure to create a solid-state weld. It is commonly used for plastics. A benefit of this method is that the temperature may be maintained below the melting point of the plastic materials. This prevents any unwanted properties which may arise from high temperature exposure of the materials, e.g., discoloration.

Similarly, the two ends of the line could be combined by using radio-frequency welding. Again, in this method, portions of the axis of the line should overlap. However, again, such overlap should not be more than 3 or 4 inches, and preferably would be less than 2 inches. This will result in a combined diameter at the overlap that is larger than the size of the two lines. Alternatively, the two ends of line could be cut at an angle, and then the two tapered portions of line overlapped prior to radio-frequency welding the line. Radio-frequency welding, also known as dielectric welding and high-frequency welding, is a plastic welding process that utilizes high-frequency electric fields to induce heating and melting of thermoplastic base materials. Advantages of this process are fast cycle times (a few seconds), automation, repeatability, and good weld appearance. Only plastics which have dipoles can be heated using radio waves and therefore not all plastics are able to be welded using this process. It is believed that radio-frequency welding would be the more preferred type of welding for combining two nylons.

It will be appreciated that in order to provide a trimmer line of two colors, each color being of essentially the same length, two different monofilaments are not always necessary. For instance, another method for making two colored line would be to wrap one colored line around a frame. Each wrap of the line would be approximately equal to the length of line that would be loaded into a trimmer head. Then the frame would be lowered into a vat of dye such that half of each wrap of line is dyed a second color. The line is then removed, and the dye allowed to dry. Each wrap of line would have areas where there is a color change. The line could be cut at one of the two color changes. The result would be lengths of line appropriate for loading into a trimmer, where half the line is one color and the other half of the line is a second color. Alternatively, the same process above could be performed using natural colored line, and then each half of each wrap of line be dyed a different color.

Yet another method to make continuous lengths of two-colored line would be to extrude the line, and to alternate the addition of colorants on a regular frequency so that the line is extruded with alternate lengths of two colors. This could be done with liquid color added to the process, or by dying the line after the filament forming part of the process.

Still another method would be to extrude bicomponent filaments using two different colors of polymer, where each color is visible on the surface of the fiber. Ideally, each component would comprise of 50% of the cross-section. On a regular frequency, the process would alternate the two streams such that the two colors trade places. After the bicomponent fiber is extruded, then it could be cut to yield lengths comprised of two colors.

It will be appreciated that by provided two substantially equal lengths of different color line, which are either joined or spliced together, or dyed or extruded such that half of the trimmer line is one color and the other half of the trimmer line is another color longitudinally, the center of the trimmer line can be readily, reliably and accurately determined by a consumer for use in threading the trimmer line through a trimmer head so that upon threading half of the trimmer line through the trimmer head, the trimmer line can then be wound onto the spool. The color change acts as a centering mechanism for aligning the trimmer line into the trimmer head.

Thus, it can be seen that the objects of the invention have been satisfied by the structure and its method for production and use as presented above. While in accordance with the Patent Statutes, only the various preferred embodiment has been presented and described in detail, it is to be understood that the invention is not limited thereto or thereby. For example, chemical bonding of the filament ends is possible, but perhaps too slow to be commercially viable. Accordingly, for an appreciation of the true scope and breadth of the invention, reference should be made to the following claims.

What is claimed is:

1. A method for determining the center of a trimmer line for use with a trimmer head of a rotary trimmer, the method comprising:
    extruding the trimmer line having a color;
    dyeing half of the length of trimmer line with a colorfast dye of a color different from the color of the trimmer line, thereby providing a trimmer line having a color change at the center of the trimmer line.

2. The method according to claim 1, wherein the step of dyeing includes changing the color of the extrudants such that half of the trimmer line is one color and the other half of the trimmer line is another color.

3. The trimmer line according to claim 2, wherein the extrudants include colorants or polymers of different colors.

* * * * *